United States Patent [19]
Luetzelschwab

[11] 3,821,110
[45] June 28, 1974

[54] SOUR WATER PURIFICATION PROCESS
[75] Inventor: Wayne E. Luetzelschwab, Littleton, Colo.
[73] Assignee: Marathon Oil Company, Findlay, Ohio
[22] Filed: Aug. 11, 1971
[21] Appl. No.: 170,940

[52] U.S. Cl. ................... 210/63, 423/542, 423/242
[51] Int. Cl. ......................... C02b 3/08, C02b 3/10
[58] Field of Search ...... 423/242, 243, 542; 210/48, 210/50, 59, 63

[56] References Cited
UNITED STATES PATENTS

| | | | |
|---|---|---|---|
| 1,908,545 | 5/1933 | Schwab | 210/50 |
| 2,778,714 | 1/1957 | Kasper et al. | 423/542 |
| 2,863,732 | 12/1958 | Bowers et al. | 210/50 |
| 3,335,071 | 8/1967 | Bollen et al. | 203/78 |
| 3,340,182 | 9/1967 | Berkman et al. | 423/563 |
| 3,531,251 | 9/1970 | Bragdon | 423/351 |

FOREIGN PATENTS OR APPLICATIONS
797,739  10/1968  Canada

Primary Examiner—Oscar R. Vertiz
Assistant Examiner—Gregory A. Heller
Attorney, Agent, or Firm—Joseph C. Herring; Richard C. Willson, Jr.; Jack L. Hummel

[57] ABSTRACT

Sulfidic water containing $H_2S$ and $NH_3$, or alkali metal or other cations forming water soluble sulfides, is mixed with water containing salts of such cations and possibly excess $SO_2$, then sent to an $H_2S$ stripper for treatment with air to produce a sulfide-depleted liquid effluent. $H_2S$ evolved from the stripper is burned to form $SO_2$ which is absorbed in an $SO_2$ absorber. A portion of the liquid effluent from the $H_2S$ stripper is used as solvent in the $SO_2$ absorber which forms additional water containing ammonium and possibly excess $SO_2$ salts for mixing with additional sour water.

7 Claims, 1 Drawing Figure

SOUR WATER PILOT PLANT

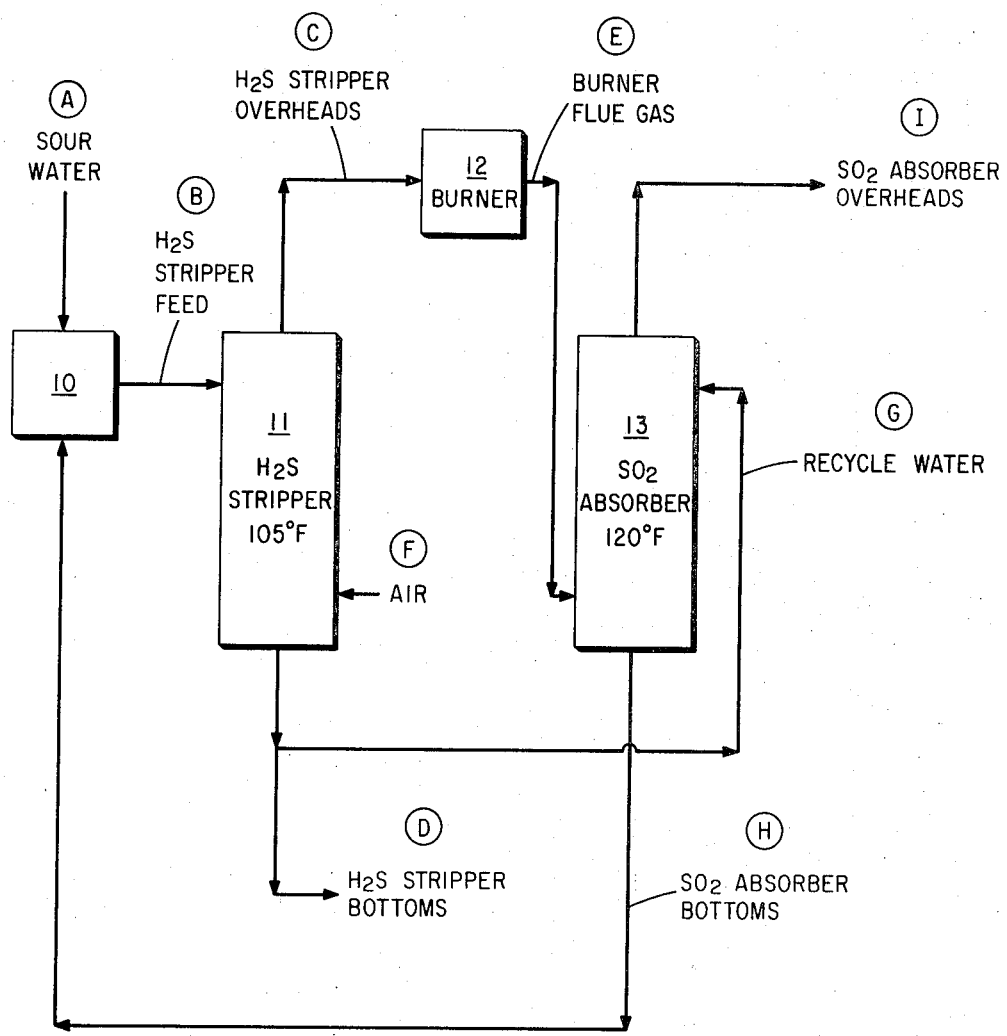
SOUR WATER PILOT PLANT

SOUR WATER PURIFICATION PROCESS

BACKGROUND OF THE INVENTION

Description of the Prior Art

U.S. Pat. No. 3,335,071 discloses passing water contaminated with ammonia and hydrogen sulfide through a hydrogen sulfide stripper under pressure to evolve some of the hydrogen sulfide at the top of the stripper. The bottom stream, containing water and ammonia, is passed through an ammonia stripper. The ammonia is removed and the remaining stream, containing water and the remaining hydrogen sulfide, is recycled into the initial stripper; U.S. Pat. No. 3,404,072 is an improvement of the previously mentioned patent. This process provides improved stability of operation in the two stripping columns during variations in composition levels by fixing the recycling condensate rate constant at a value proportional to the feed rate; U.S. Pat. No. 3,428,426 processes an aqueous system, such as an ammonia base sulfite liquor, to produce ammonia. This process is effected by the vaporization of ammonia in the presence of a plurality of small inert spheres; U.S. Pat. No. 2,773,003 treats refinery waste water streams to remove hydrogen sulfide, ammonia, mercaptans, cyanides, phenols, and other contaminating substances. This process strips the contaminated water and passes the stripped water to a mixing column and a polymerizer feed preparation column. No mention is made as to the disposal of the stripped contaminants.

None of the above references teach the present invention with its ability to utilize sour water containing ammonia or other cations which form water soluble sulfides, particularly those resulting from the refining of high sulfur crude oils.

SUMMARY OF THE INVENTION

General Statement of the Invention

The present invention removes unacceptable pollutants comprising $H_2S$, and light hydrocarbons from a refinery sulfidic water stream and discharges them as acceptable sulfite or bisulfite salts, (or sulfates or bisulfates, upon oxidation). $H_2S$ is stripped from the sour water, then burned to produce $SO_2$ which is absorbed into a portion of the $H_2S$-stripped sulfidic water in an $SO_2$ absorption zone to form an aqueous bisulfite stream, which in turn, is recycled back to mix with the incoming sulfidic water stream. The aqueous bisulfite stream from the $SO_2$ absorption zone can contain sulfites, bisulfites, sulfates, or bisulfates, according to pH and degree of oxidation.

Utility of the Invention

While the invention is adaptable to any stream containing water, $H_2S$ and $NH_3$, and/or alkali metal and/or any other cation forming water soluble sulfide, its preferred commercial use will be in the purification of "sour" water streams which commonly result from the refining of sulfur-containing crude oils. Such streams are contaminated with both $H_2S$ emitted from e.g., the crude distillation step of the refining process and with $NH_3$, produced by e.g., the hydrogenation step of the refining process, or added to fractionator overheads to neutralize the $H_2S$ to inhibit corrosion.

BRIEF DESCRIPTION OF THE DRAWING

The drawing is a schematic diagram of an apparatus for the practice of the present invention. Specific streams are designated by letters and their content is given in Table 1.

DESCRIPTION OF THE PREFERRED EMBODIMENT

Starting Materials

It is a particular feature of the present invention that, in many instances, the sour water itself is the only material (other than air) required for its own purification. Sulfidic water will contain preferably from about 5 to about 200,000 more preferably from about 100 to about 100,000, and most preferably from about 200 to about 50,000 parts per million by weight of $H_2S$ (or sulfide equivalent) and preferably from 5 to about 200,000, more preferably from about 100 to about 100,000, and most preferably from about 200 to about 50,000 parts per million of $NH_3$ and/or alkali metal ions, e.g., Li, K, Na, and/or other cations forming water soluble sulfides, e.g., tungsten, thallium, calcium, and rubidium.

The effluent from the apparatus of the invention will generally contain in the range of from about 0.0001 to about 1,000, more commonly from about 0.001 to about 100, and most preferably from about 0.01 to about 50 parts per million by weight of hydrogen sulfide.

The recycle water can contain from 0 to about 100,000, more commonly from 100 to about 50,000, and most preferably from about 500 to about 30,000 parts per million of sulfur dioxide. In such cases, the effluent will generally contain in the range of from about 5 to about 100,000, more preferably from about 100 to about 50,000, and most preferably from about 500 to about 10,000 of sulfur dioxide. The components of $H_2S$, $SO_2$, $NH_3$, and the like should be understood to often be present as salts such as $(NH_4)_2S$, $NH_4HS$, $NH_4HSO_3$, and $(NH_4)_2SO_3$, or the corresponding salts of alkali metals or other cations.

The sour water can contain other impurities though the present invention is related primarily to the removal of $H_2S$, and the related sulfidic compounds.

Oxygen-containing Gas

Air is the preferred oxygen-containing gas, but air enriched with oxygen, oxygen mixed with inert gases, or pure oxygen itself, can be employed in specialized cases where desired.

Temperatures

The operating temperature in the hydrogen sulfide stripper will ordinarily be in the range of from the freezing point of the influent to about 400, more preferably from 50 to about 250, and most preferably from 70° to about 200°F. The sulfur dioxide absorber will generally operate in the range of from the freezing point of the influent to about 400, more preferably from about 40 to about 300, and most preferably from about 50° to about 150°F.

Pressure

Though not narrowly critical, the pressure in the $H_2S$ stripper and the sulfur dioxide absorber will be in the range from of from 0.1 to about 200, more preferably from about 1 to about 30, and most preferably from about 10 to about 25 pounds per square inch absolute.

In most instances, atmospheric or near-atmospheric pressures will be employed.

Liquid Hourly Space Velocities

The Liquid Hourly Space Velocities (LHSV) in the $H_2S$ stripper will be in the range of from about 1 to about 5,000, more preferably from about 10 to about 1,000, and most preferably from about 20 to about 500 per hour. The LHSV in the $SO_2$ absorber will be from about 1 to about 5,000, more preferably from about 10 to about 1,000, and most preferably from about 20 to about 500 per hour.

Gaseous Hourly Space Velocity

The Gaseous Hourly Space Velocity (GHSV) in the sulfur dioxide absorber will be in the range of from about 1 to about 20,000, more preferably from about 20 to about 5,000, and most preferably from about 50 to about 1,000 per hour. This GHSV and the LHSV of the stripper and of the absorber will, of course, be balanced for a particular feedstock and system of apparatus. Apparatus: The $H_2S$ stripper is of generally conventional design and can be a cylindrical tower with trays or packed with ceramic saddles or other conventional high surface area packing materials. In a typical small installation such as described below, the tower is 6 inches I.D. with ten feet of ceramic packing which has been found sufficient for 105°F operation. The height of the packing will be decreased with operation at higher temperatures.

The $SO_2$ absorber can also be a cylindrical tower with trays or packed with ceramic saddles or similar high surface area packing material. In the example described below, the tower has an interior diameter of 4 inches and the packing is 10 feet high, which height has been found suitable for 120°F. operation. The absorber height will increase with increasing operating temperature.

Burner

Any type of enclosed burner is satisfactory and a continuous ignition source is a desirable feature.

Example

Referring to the drawing, sour water A enters mixing zone (tee) 10 where it is mixed with $SO_2$ absorber bottoms H, containing $NH_3$ and $SO_2$. This acidification of sour water A with $SO_2$ absorber bottoms H facilitates $H_2S$ stripping. The mixture B flows into $H_2S$ stripper 11 (compositions of all of the streams designated by letters are given in Table 1). The mixture B trickles down over the packing in the $H_2S$ stripper, while air F moves upward, stripping $H_2S$ from the mixture and exiting as $H_2S$ stripper overheads C. $H_2S$ stripper overheads C are fed to burner 12 where they are ignited and burned, producing an $SO_2$-containing flue gas E which is fed upward through $SO_2$ absorber 13, operating at 120°F. A portion of the $H_2S$ stripper bottom effluent D can be taken off as recycle water G and fed downward through $SO_2$ absorber 13 contacting the upward moving burner flue gas stream E and producing $SO_2$ absorber overheads I. Alternatively fresh water can be used with recycle stream G or in place of it where desired, e.g., to increase the pH of stream H. These overheads which are the effluent gas from the overall process, contain nitrogen, oxygen, and just a trace of sulfur dioxide and cause no significant atmospheric pollution.

The remaining bottom effluent from $H_2S$ stripper 11, $H_2S$ stripper bottoms D, is the effluent liquid from the overall process and contains water plus small quantities of $NH_3$ and $SO_2$, together with only a trace of highly objectionable hydrogen sulfide. This effluent may be emitted to flowing streams where it poses no significant pollution hazard.

The $SO_2$ absorber bottoms H are recycled back to the mixing zone 10.

Table 1

| | | Water | $H_2S$ | | $NH_3$ | | $SO_2$ | $N_2$ | $O_2$ |
|---|---|---|---|---|---|---|---|---|---|
| | | (Flow rates in lb/hr) | | | | | | | |
| A | Sour Water | 1250 | 1.88 | (1500 ppm) | 1.75 | (1400 ppm) | — | — | — |
| B | $H_2S$ stripper feed | 2350 | 1.88 | | 3.29 | | 6.64 | — | — |
| C | $H_2S$ stripper overheads | — | 1.88 | | — | | — | 16.2 | 4.9 |
| D | $H_2S$ stripper bottoms | 1250 | <1 ppm | | 1.75 | | 3.53 | — | — |
| E | Burner Flue Gas | — | — | | — | | 3.53 | 16.2 | 1.8 |
| F | Air | — | — | | — | | — | 16.2 | 4.9 |
| G | Recycle Water | 1100 | — | | 1.54 | | 3.11 | — | — |
| H | $SO_2$ absorber bottoms | 1100 | — | | 1.54 | | 6.64 | — | — |
| I | $SO_2$ absorber overheads | — | — | | — | | <1 ppm | 16.2 | 1.8 |

Modifications of the Invention

It should be understood that the invention is capable of a variety of modifications and variations which will be made apparent to those skilled in the art by a reading of the specification and which are to be included within the spirit of the claims appended hereto. For example, the packed tower absorber and stripper can be replaced with other well-known gas-liquid contacting devices, e.g., tray towers, spray towers, and stirred tanks.

While the above invention has generally been discussed and exemplified with respect to sour water streams containing hydrogen sulfide, together with ammonia, it should be understood that the invention is applicable without major change in operating conditions or techniques, to the purification of streams which contain hydrogen sulfide in conjunction with other cations.

Included among such other sulfide contaminants are alkali hydrosulfides, e.g., sodium hydrosulfide, potassium hydrosulfide, lithium hydrosulfide, alkali metal monosulfides, e.g., sodium monosulfide, potassium monosulfide, alkali metal polysulfides, e.g., sodium tetrasulfide, sodium pentasulfide, potassium disulfide, potassium tetrasulfide, potassium pentasulfide, lithium sulfide, and all other water-soluble sulfides, e.g., rubidium sulfide, strontium hydrosulfide, strontium tetrasulfide, thallium sulfide, tungsten trisulfide, calcium hydrosulfide, calcium hydrosulfide, calcium sulfide, cesium sulfide, cesium disulfide.

Other modifications include the oxidation of some of the $SO_2$ to $SO_3$ as it leaves the $SO_2$ burner, e.g., by merely contacting the hot $SO_2$ with an $SO_2$-oxidation catalyst in the presence of excess air. The resulting $SO_3$ forms sulfates rather than sulfites.

Water soluble cobalt II salts or other oxidation catalysts can be added to the incoming sulfidic water to oxidize the sulfites and bisulfites to sulfates and bisulfates which are frequently more acceptable in plant effluents.

Referring to the drawing, a portion of the burner flue gas stream E can be sent directly to the $H_2S$ stripper 11, most conveniently mixed with airstream F, in order to utilize the $H_2S$ stripper for some of the necessary $SO_2$ absorption. This permits the use of a smaller $SO_2$ absorber.

Fuel gas can be added to the $H_2S$ stripper overheads C to give a steadier total combustible gas input to the burner if severe fluctuations of the $H_2S$ content of the sour water A would otherwise result in poor burner operation.

As mentioned previously, all or part of stream G can be replaced with additional non-sulfidic water from any convenient source.

These and many other modifications will be possible, particularly to optimize the treatment of specific sulfidic waters.

What is claimed is:

1. A process for the purification of sulfidic water polluted with hydrogen sulfide and cations which form soluble sulfides by mixing such sulfidic water with aqueous solutions comprising sulfites, bisulfites, sulfates, or bisulfates, comprising;
   a. contacting the mixed stream with oxygen-containing gas in an $H_2S$ stripping zone to evolve a gaseous stream comprising $H_2S$ and oxygen, and a stripped liquid effluent depleted in $H_2S$,
   b. burning at least a portion of the $H_2S$ evolved from the stripping zone to form $SO_2$,
   c. contacting at least a portion of the $SO_2$ formed by burning of the $H_2S$ with diluent selected from the group consisting of additional water and the stripped effluent from the $H_2S$ stripping zone in an $SO_2$ scrubbing zone to form water containing salts comprising sulfites, bisulfites, sulfates, or bisulfates of said cations,
   d. recycling at least a portion of said aqueous solution containing said salts for contacting with said sulfidic water in step (a).

2. A process according to claim 1 wherein said sulfidic water contains from about 100 to about 100,000 parts per million of sulfides.

3. A process according to claim 1 wherein the sulfidic water contains from 5 to about 200,000 parts per million of ions selected from the group consisting of ammonia, alkali metal ions, or other ions which form water soluble sulfides.

4. A process according to claim 3 wherein said ions are selected from the group consisting of ammonia, alkali metals, tungsten, thallium, rubidium, strontium, and cesium.

5. A process according to claim 1 wherein said aqueous solutions containing salts comprising sulfites, bisulfites, sulfates, or bisulfates of said ions, also contain free sulfur dioxide.

6. A process for the purification of sour water polluted with hydrogen sulfide and ammonia in the form of sulfides of ammonia comprising;
   a. mixing said sour water with an aqueous solution comprising bisulfites to form a mixed stream,
   b. contacting the mixed stream with air in an $H_2S$ stripping zone to evolve a gaseous stream comprising $H_2S$ and oxygen and a stripped liquid effluent depleted in sulfides,
   c. burning at least a portion of the $H_2S$ evolved from the stripping zone to form $SO_2$,
   d. contacting at least a portion of the $SO_2$ formed by burning of the $H_2S$ with diluent selected from the group consisting of additional water and the stripped effluent from the $H_2S$ stripping zone in an $SO_2$ adsorption zone to form aqueous solutions comprising ammonia bisulfite,
   e. recycling at least a portion of said aqueous solution containing ammonium bisulfite for contacting with said sour water.

7. A process for the purification of sulfidic water polluted with hydrogen sulfide and sodium in the form of sulfides of sodium comprising;
   a. mixing said sulfidic water with an aqueous solution comprising bisulfites to form a mixed stream,
   b. contacting the mixed stream with air in an $H_2S$ stripping zone to evolve a gaseous stream comprising $H_2S$ and oxygen and a stripped liquid effluent depleted in sulfides,
   c. burning at least a portion of the $H_2S$ evolved from the stripping zone to form $SO_2$,
   d. contacting at least a portion of the $SO_2$ formed by burning of the $H_2S$ with at least a portion of the stripped effluent from the $H_2S$ stripping zone in an $SO_2$ adsorption zone to form aqueous solutions comprising sodium bisulfite,
   e. recycling at least a portion of said aqueous solution containing sodium bisulfite for contacting with said sulfidic water.

* * * * *